(12) United States Patent
Simony (10) Patent No.: US 11,856,307 B2
(45) Date of Patent: Dec. 26, 2023

(54) POWER SUPPLY CIRCUIT

(71) Applicant: STMicroelectronics (Grenoble 2) SAS, Grenoble (FR)

(72) Inventor: Laurent Simony, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 18/052,478

(22) Filed: Nov. 3, 2022

(65) Prior Publication Data

US 2023/0145151 A1  May 11, 2023

(30) Foreign Application Priority Data

Nov. 5, 2021  (FR) ...................................... 2111782

(51) Int. Cl.
| | |
|---|---|
| *H04N 25/709* | (2023.01) |
| *H04N 25/77* | (2023.01) |
| *H02M 3/155* | (2006.01) |
| *G05F 1/575* | (2006.01) |
| *H01L 29/786* | (2006.01) |
| *H03M 1/08* | (2006.01) |

(52) U.S. Cl.
CPC .......... *H04N 25/709* (2023.01); *H02M 3/155* (2013.01); *H04N 25/77* (2023.01)

(58) Field of Classification Search
CPC ..... H04N 25/709; H04N 25/77; H02M 3/155; H02M 1/08; H01L 29/78648; H03M 1/0863; H03M 1/08; G05F 1/575; G05F 3/205

See application file for complete search history.

(56) References Cited

U.S. PATENT DOCUMENTS

| | | | | |
|---|---|---|---|---|
| 4,232,363 A | * | 11/1980 | Higuchi | G05F 1/62 363/75 |
| 4,660,136 A | * | 4/1987 | Montorefano | H02M 3/33561 363/26 |
| 7,907,074 B2 | * | 3/2011 | Zanchi | H03M 1/08 341/155 |
| 8,081,245 B2 | * | 12/2011 | Itano | H04N 25/75 348/301 |
| 8,237,418 B1 | | 8/2012 | Krishna | |
| 9,923,527 B2 | * | 3/2018 | McKay | H01L 27/092 |
| 10,969,845 B2 | * | 4/2021 | Yang | G06F 1/62 |
| 2006/0034102 A1 | * | 2/2006 | Yang | H02M 3/33507 363/21.13 |

(Continued)

FOREIGN PATENT DOCUMENTS

WO  2017034795 A1  3/2017

*Primary Examiner* — Marly S Camargo
(74) *Attorney, Agent, or Firm* — Slater Matsil, LP (57) ABSTRACT

In accordance with an embodiment, a power supply circuit includes: a first transistor device comprising a first gate associated with a first transconductance and a second gate associated with a transconductance greater than the first transconductance; and a second transistor device including a third gate associated with a second transconductance and a fourth gate associated with a transconductance greater than the second transconductance. The second transistor device is configured to supply power to at least one load, the first and the third gates are controlled by a closed regulation loop, and the second and the fourth gates are controlled by a sampled reference voltage.

24 Claims, 5 Drawing Sheets

(56) References Cited

U.S. PATENT DOCUMENTS

| | | |
|---|---|---|
| 2009/0121912 A1 | 5/2009 | Zanchi et al. |
| 2009/0167914 A1 | 7/2009 | Itano et al. |
| 2017/0052552 A1* | 2/2017 | Mahmoudi ............. G05F 1/575 |
| 2017/0324385 A1 | 11/2017 | McKay |
| 2023/0163736 A1* | 5/2023 | Min .................... H03F 3/45183 |

* cited by examiner

POWER SUPPLY CIRCUIT

CROSS-REFERENCE TO RELATED APPLICATIONS

This application claims the priority benefit of French patent application number FR2111782, filed on Nov. 5, 2021, entitled "Circuit d'alimentation", which is hereby incorporated by reference to the maximum extent allowable by law.

TECHNICAL FIELD

The present description generally concerns power supply circuits.

BACKGROUND

Many applications require a low-noise electric power supply. This is for example the case of sensors, particularly image sensors. In these applications, the effects of the noise injected by the power supply and of the electronic noise of the components are significant since the sensor pixels generally do not reject noise sufficiently to be able to obtain the desired image quality.

For such noise-sensitive applications, it is thus desirable for the power supply to have a very good power supply rejection ratio (PSRR), in the order of 50 dB, and over a wide frequency range, for example, up to 10 MHz for image sensors.

In existing solutions, either the PSRR is not adequate, or the performance is limited in terms of frequency and noise.

SUMMARY

An embodiment provides a power supply circuit comprising: a first transistor device comprising a first gate associated with a first transconductance and a second gate associated with a transconductance greater than the first transconductance; and a second transistor device comprising a third gate associated with a second transconductance and a fourth gate associated with a transconductance greater than the second transconductance. The first and the third gates are controlled by a closed regulation loop, the second and the fourth gate are controlled by a sampled reference voltage; and the second transistor device are capable of powering at least one load.

An embodiment provides a load powering method, comprising: controlling a first gate of a first transistor device with a closed regulation loop; controlling a second gate of the first device with a sampled reference voltage, the first gate being associated with a first transconductance and the second gate being associated with a transconductance greater than that associated with the first gate; controlling a third gate of a second transistor device with the closed regulation loop; and controlling a fourth gate of the second transistor device with the sampled reference voltage, the third gate being associated with a second transconductance and the fourth gate being associated with a transconductance greater than the second transconductance; the second transistor device being configured to power at least one load when the control steps are carried out.

According to an embodiment, the closed regulation loop is formed by an operational amplifier taking, as a non-inverting input, a voltage to be followed and, as an inverting input, a voltage present on a source of the first transistor device; and the first and the third gates are coupled to the output of the operational amplifier.

According to an embodiment, the first gate of the first transistor device and the third gate of the second transistor device are back gates.

According to an embodiment, the reference voltage is generated by another closed regulation loop comprising a transistor having its front gate coupled to the output of an operational amplifier; the transistors of the first and second transistor devices and the transistor of the other closed regulation loop being matched together.

According to an embodiment, the transistor of the other closed regulation comprises a back gate; and the voltage applied to the first gate of the first transistor device by the amplifier is equal to the voltage applied to said back gate of the transistor of the other closed regulation loop.

According to an embodiment, the first transistor device comprises a first transistor comprising the first gate and a second transistor comprising the second gate, a source of the first transistor being connected to a source of the second transistor and a drain of the first transistor being connected to a drain of the second transistor; and the second transistor device comprises a third transistor comprising the third gate and a fourth transistor comprising the fourth gate, a source of the third transistor being connected to a source of the fourth transistor, a drain of the third transistor being connected to a drain of the fourth transistor.

According to an embodiment, a width of the second transistor is greater than that of the first transistor and/or a width of the third transistor is greater than that of the fourth transistor.

According to an embodiment, the circuit comprises a plurality of other second transistor devices having their third gates connected to one another; each second device being configured to power a different load.

According to an embodiment, the second transistor devices each comprise a source, the sources being coupled together.

According to an embodiment, the width of the second transistor device is a multiple k of the width of the first transistor device, multiple k being equal to or greater than 5, for example equal to or greater than 150.

According to an embodiment, the width W2 of transistor MLOOP2 is greater than the width W1 of transistor MLOOP1 by a scale factor Mw=W2/W1 equal to or greater than 5, for example, in the range from 10 to 20.

According to an embodiment, the sampling of the reference voltage to control the second gate is implemented by a first capacitor having an electrode receiving the reference voltage via a first switch; and the sampling of reference voltage to control the fourth gate is implemented by a second capacitor having an electrode receiving the reference voltage via a second switch.

An embodiment provides an image sensor comprising: a power supply circuit; and one or a plurality of pixels powered by the power supply circuit.

An embodiment provides an image sensor comprising: a power supply circuit; and
    pixel columns, each powered by one of the second transistor devices.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
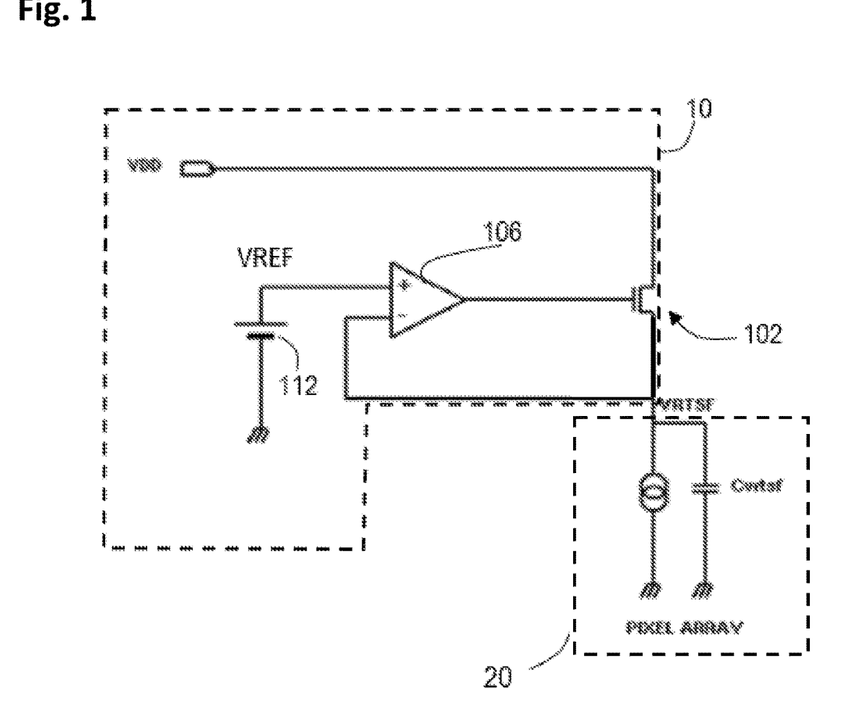
FIG. 1 schematically shows an example of a closed loop power supply circuit powering a pixel array.

FIG. 1 schematically shows an example of a closed loop power supply circuit 10 powering a pixel array 20 (PIXEL ARRAY). Generally, in the figures of the present description, pixel array 20 is represented by a current source corresponding to the bias current used for the reading of the pixels. This current source is arranged in parallel with a capacitive element Cvrtsf, which represents the sum of the capacitive elements of the pixels.

According to an example of FIG. 1, power supply circuit 10 comprises a transistor 102 powering pixel array 20. The gate of transistor 102 is coupled to the output of an operational amplifier 106. The drain of transistor 102 is connected to a rail of supply of a voltage VDD. The source of transistor 102 is connected to pixel array 20. The source is further coupled to the inverting input of operational amplifier 106 to form a closed loop. Operational amplifier 106 is configured to receive on its non-inverting input a reference voltage VREF delivered by a voltage generator 112. Voltage VREF is a set point voltage and corresponds to the value desired for the power supply of the pixels. In particular, reference voltage VREF may be considered as non-noisy and may be decoupled from the power supply, for example by being sampled from a capacitive element. Reference voltage VREF is for example positive and in the range from 1.4 V to 2.8 V.

In operation, the closed loop formed by operational amplifier 106 imposes a voltage to the gate of transistor 102 so that the voltage VRTSF delivered to pixel 20 tends towards VREF.

Although this example of power supply circuit enables the active regulation of a power supply voltage VRTSF, it comprises certain disadvantages. For example, the active correction, like the PSRR, may be frequency-limited to ensure the stability due to the strong capacitance Cvrtsf of the pixels. Noise originating from operational amplifier 106 may further appear at its output, and thus on power supply voltage VRTSF. This may cause row noise in pixel array 20 in the case where the shuttering and/or the reading of the array are performed row by row. Such a power supply circuit may further require providing a decoupling capacitive element external to the power supply circuit. This external decoupling capacitive element increases the time constants and might imply a separation of the inner and outer grounds, which adversely affects the decoupling. It also causes inductive effects due to its implantation.

Figure 2:
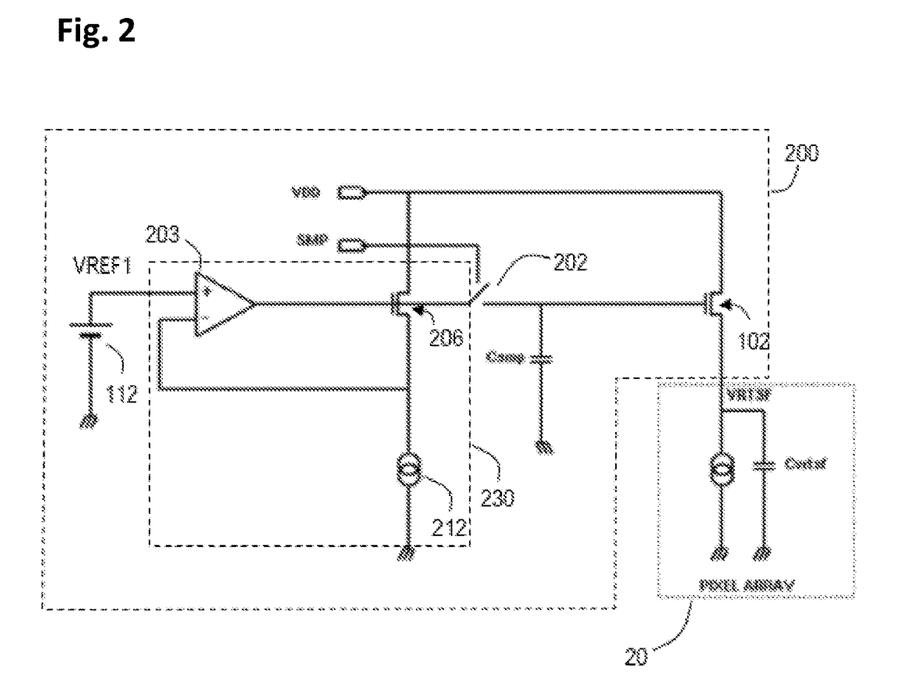
FIG. 2 schematically shows an example of an open loop power supply circuit powering a pixel array.

FIG. 2 schematically shows an example of the open loop power supply circuit 200 powering pixel array 20. Power supply circuit 200 is passive in that closed loop correction is not enabled.

The power supply circuit 200 of FIG. 2 comprises transistor 102 and voltage generator 112, similar to power supply circuit 10. In power supply circuit 200, the gate of transistor 102 is coupled on the one hand to an electrode of a sampling capacitor Csmp referenced to ground and on the other hand to the output of an operational amplifier 203 via a switch 202 controlled by a switching signal SMP. The output of operational amplifier 203 is further coupled to the gate of a transistor 206. The drain of transistor 206 is coupled to the rail of supply of voltage VDD. The source of transistor 206 is coupled both to a current source 212 and to the inverting input of operational amplifier 106 to form a closed loop. Operational amplifier 203 receives on its non-inverting input reference voltage VREF.

When switch 202 is set to the off state, the voltage present at the level of the gate of transistor 206 is sampled, and held by capacitor Csmp on the gate of transistor 102. The source of transistor 102 follows the voltage present at the level of its gate to deliver power supply voltage VRTSF to pixel array 20.

The advantage of using switch 202 is that it enables making the circuit passive on the side of the pixel power supply. As opposed to the example of FIG. 1, switch 202 further enables no longer including the high capacitance of pixels Cvrtsf in the closed loop, and it enables avoiding the frequency limitation due to this capacitance. Switch 202 further enables making the delivery of voltage VRTSF independent from the closed regulation loop 230 formed of amplifier 203, of current source 212, and of transistor 206. However, power supply circuit 200 comprises certain disadvantages. For example, in certain cases where voltage VDD is relatively low, transistor 102 might be insufficiently saturated, which would limit the PSRR. To better saturate the transistor, its width should be increased. In this case, the capacitive divider formed by the gate-drain capacitive element of transistor 102 and sampling capacitive element Csmp might limit the attenuation of the power supply noise. The Early effect of transistor 102 also is a limitation of the example of FIG. 2 since the source undergoes a modulation proportional to the drain modulation. To obtain a better saturation of transistor 102, its voltage VDD could be increased by a charge pump, but this would result in an increase in the power consumption. Further, the voltage at the gate of transistor 102 being fixed when switch 202 is in the off state, the insulation of power supply VDD is passive and thus less efficient than a closed loop. Such a power supply circuit may further require providing a decoupling capacitive element external to the power supply circuit.

Figure 3:
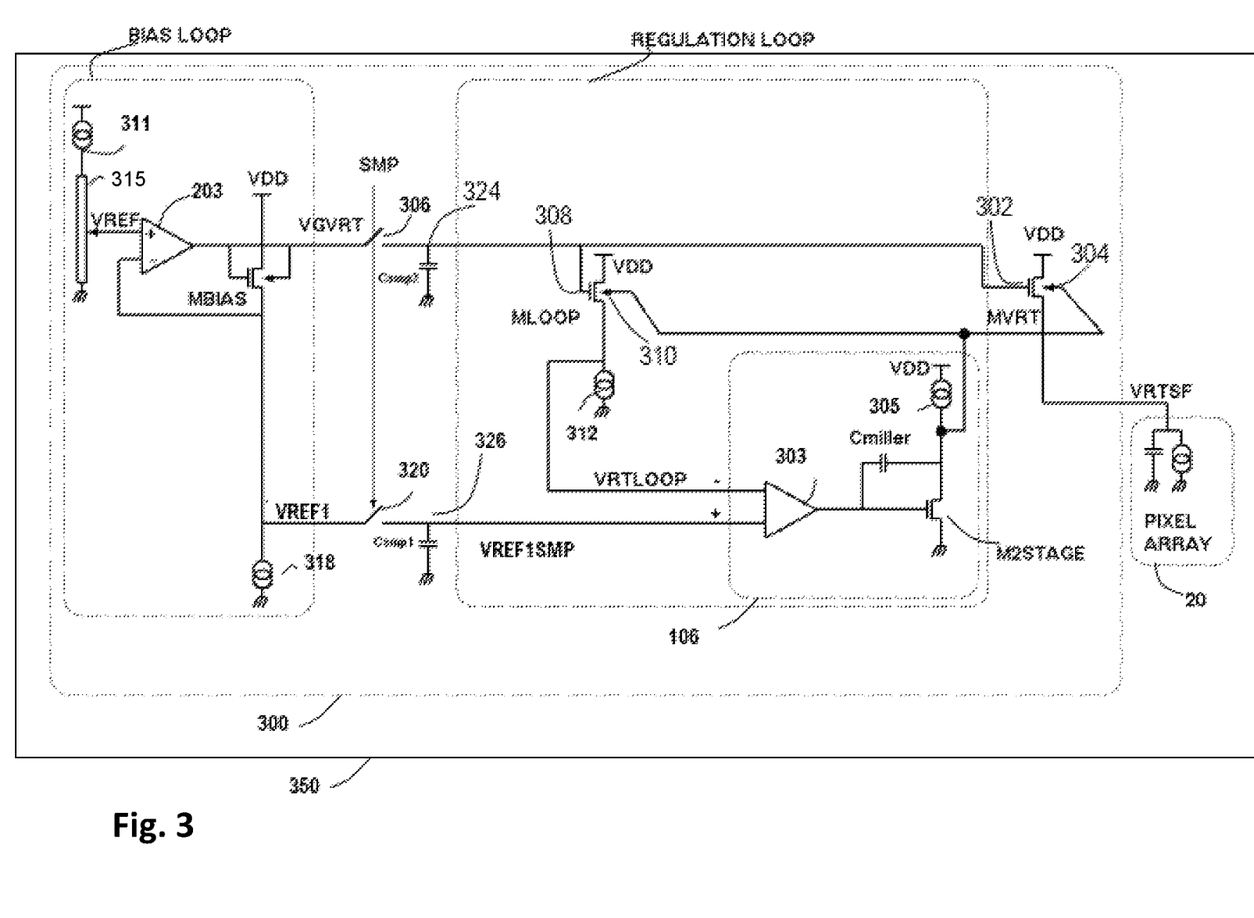
FIG. 3 schematically shows an image sensor comprising a power supply circuit powering a pixel array according to an embodiment of the present description.

FIG. 3 schematically shows an image sensor 350 comprising a power supply circuit 300 according to an embodiment of the present description. Power supply circuit 300 for example powers the above-described pixel array 20.

The power supply circuit 300 of FIG. 3 comprises a closed feedback loop REGULATION LOOP associated with a closed bias loop BIAS LOOP. Loop BIAS LOOP enables defining the operating point of feedback loop REGULATION LOOP by for example delivering bias and set point voltages VGVRT and VREF1. Feedback loop REGULATION LOOP corrects low-amplitude disturbances which are in particular due to the power supply noise.

Closed feedback loop REGULATION LOOP for example acts on a transistor MVRT having its source coupled, preferably connected, to pixel array 20. The drain of transistor MVRT is coupled, preferably connected, to power supply rail VDD. Transistor MVRT comprises a front gate 302 and a back gate 304.

Generally, the terms "back gate" and "front gate" signify that the back and front gates may act separately, and with a different associated transconductance, on a same channel of the transistor. The back and front gates may for example correspond to the technology using a depleted, preferably fully depleted, semiconductor substrate on insulator (Fully Depleted Silicon on Insulator, FDSOI).

Feedback loop REGULATION LOOP comprises a transistor MLOOP having a front gate 308 coupled, preferably connected, to the front gate 302 of transistor MVRT and a back gate 310 coupled, preferably connected, to the back gate 304 of transistor MVRT and to the output of operational amplifier 106, similar to that of FIG. 1. FIG. 3 illustrates a specific embodiment of this operational amplifier 106.

According to an example of embodiment, back gate 304 is completely arranged in a substrate of power supply circuit 300, and the channel of transistor MVRT is formed in a silicon layer insulated from the substrate by an insulating layer. Back gate 304 is thus electrically insulated from the channel of transistor MVRT. Further, front gate 302 is for example arranged at the surface of the substrate and electrically insulated from the transistor channel with an insulating layer having a lower thickness than the insulator layer separating the back gates of the transistor channel. By matching, the back gate 310 and the front gate 308 of transistor MLOOP may be respectively arranged similarly to the back gate 304 and to the front gate 302 of transistor MVRT.

Due to the relative oxide thicknesses of the front and back gates, the capacitance associated with each back gate 304, 310 is smaller than the capacitance associated with each front 302, 308. The transconductance associated with each back gate 304, 310 is also smaller than the transconductance associated with each front gate 302, 308.

According to an embodiment, the substrate of power supply circuit 300 is a FDSOI-type substrate. In this case, back gates 304, 310 may be formed under the insulator layer. Further, front gate 302 and/or front gate 308 may be formed at the surface above the insulator.

In power supply circuit 300, the front gate 302 of transistor MVRT is coupled, preferably connected, at the level of a node 324, on the one hand to an electrode of a sampling capacitor Csmp2 referenced to ground and on the other hand to the output of bias loop BIAS LOOP, via a switch 306 controlled by switch signal SMP.

According to an embodiment, transistor MLOOP has a size smaller, for example, one hundred times smaller, than that of transistor MVRT. Indeed, transistor MVRT is sized to power pixel array 20 while transistor MLOOP is used to generate the voltage of the back gate to the applied to transistor MVRT. Transistors MLOOP and MVRT, as well as the associated current sources, may in particular be matched with respect to each other, that is, the density of current flowing therethrough is the same or substantially the same. The matching between transistors may further signify that the voltages that they receive on their drains, sources, and gates are similar from one transistor to the other and/or that their structure is similar.

The drain of transistor MLOOP is connected to power supply rail VDD. The source of transistor MLOOP is coupled, preferably connected, both to a current source 312, coupled to ground, and to the inverting input of operational amplifier 106 to form a closed loop. On the contrary, the source of the transistor MVRT is not coupled, or connected to the closed loop, and in particular to the operational amplifier. Otherwise said, the transistor MVRT source does not supply the closed loop. Furthermore, the source of the transistor MLOOP is not coupled, or connected, to the transistor MVRT, nor to the load. Thus, the capacitances at the sources of the transistors MLOOP and MVRT are independent from each other, and the capacitance at the source of the transistor MLOOP can be configured to be lower than the capacitance at the source of the transistor MVRT.

In an example, the width of transistor device MVRT is a multiple k of the width of the transistor device MLOOP, where the multiple k is for example equal to or greater than 1, and the source of the transistor device MLOOP is configured to have a capacitance that is at least 10.k times smaller than the capacitance of the load 20 present at the source of the transistor MVRT, and in some cases at least 100*k times smaller than the capacitance of the load 20 present at the source of the transistor MVRT.

An advantage associated with the fact that the transistor MVRT source is not supplying the closed loop, is that the product gain x bandwidth of the closed loop can be high enough to optimize the PSRR in the desired operating frequency range, which is for example of around 10 MHz. Moreover, in order to guarantee the stability of the closed loop, the other elements of the loop should not introduce a pole below the product gain x bandwidth of the closed loop. More specifically, the pole formed by the output impedance of amplifier 106 combined with the capacitance of the backgate of devices MLOOP and MVRT, and the pole formed by the output impedance of the device MLOOP combined with the capacitance at node VRTLOOP, should both have a frequency greater than a product gain x bandwidth of the closed loop. Including the source of the transistor MVRT in the closed loop would create a pole at a relatively low frequency due to the load capacitance of the load 20. Indeed, the load capacitance of the load 20 would cause an instability of the circuit at the expected PSRR performance and the product gain x bandwidth would limit the PSRR performance to an insufficient level.

Another advantage of having the source of the transistor MLOOP not connected to the load 20 is that the transistor MLOOP can be configured to have a relatively low capacitance at its source, rather than the capacitance of the load, which for example corresponds to the capacitance of the pixel array. This allows a stability, particularly around the desired operating frequency range of 10 MHz.

The output voltage of the amplifier 106, applied to the back gate of the device MVRT, is for example able to correct the PSRR at the output node VRTSF of the power supply circuit, as its bandwidth is higher than the voltage supply noise from the supply rail VDD due to the fact that the capacitance of the back gates is significantly less than (for example only 15% of) the capacitance of the front gates.

The actuation of switch 306 with signal SMP sampling, and storing voltage VGVRT on capacitor Csmp2. In particular, when switch 306 is set to the off state, voltage VGVRT is sampled and held by capacitor Csmp2 at the level of front gates 302, 308. The source of transistor MVRT follows the voltage present at the level of front gate 302 to deliver power supply voltage VRTSF, linked to voltage VGVRT, to pixel array 20. The source of transistor MLOOP follows the voltage present at the level of gate 308 to deliver a voltage VRTLOOP, linked to voltage VGVRT, which is fed back the loop.

In operation, the voltage held on front gate 308 by capacitor Csmp2 determines a voltage at the source of transistor MLOOP so that voltage VRTLOOP is, for example by matching, an image of voltage VREF1. Further, the loop formed by operational amplifier 106 imposes a voltage to the back gate 310 of transistor MLOOP, so that voltage VRTLOOP tends towards VREF1, independently from power supply VDD. This power supply noise can thus be corrected.

The output of operational amplifier 106 further imposes a voltage on the back gate 304 of transistor MVRT to correct the voltage induced on front gate 302. According to an example, the feedback to the back gate 304 of the transistor MVRT and to the back gate 310 of transistor MLOOP is generated without any resistive divider, the source of the transistor MLOOP being connected, for example, directly to an input of the operational amplifier 106. In this case, more gain is obtained in the closed loop, which enhances the gain times bandwidth product contrary to the case in which a resistive divider is present. According to an example where there exists a matching between transistors MLOOP and MVRT, the correction applied by the regulation loop to back gate 310 to correct the power supply noise at node VTRLOOP, is that same as that to be applied to the back gate of transistor MVRT, to correct the power supply noise at node VRTSF. According to an embodiment, the width of transistor MVRT is a multiple k of the width of transistor MLOOP. For example, multiple k is equal to or greater than 5, for example, equal to or greater than 150. The size, that is, the width, of transistor MVRT being greater than the size of transistor MLOOP, the current supplied at the level of the source of transistor MVRT may be higher than at the level of the source of transistor MLOOP. In particular, the density of the current within these transistors is the same or substantially the same.

The operational amplifier 106 of circuit 300 for example comprises a first differential stage 303. The output of first differential stage 303 is coupled, for example connected, to the gate of a transistor M2STAGE to form a second amplification stage of operational amplifier 106. The drain of transistor M2STAGE is charged by a current source 305 connected for example to power supply rail VDD, and also connected to the back gates of transistors MVRT and MLOOP.

In certain cases, a capacitor Cmiller, which is for example a so-called "Miller" compensation capacitive element, couples the drain and the gate of transistor M2STAGE. This helps ensure the stability of the amplifier.

Operational amplifier 106 receives on its non-inverting input reference voltage VREF1SMP, which in the example of FIG. 3, represents a reference voltage VREF1 once sampled. According to an embodiment, to obtain reference voltage VREF1SMP, the source of transistor MBIAS is coupled to an electrode of sampling capacitor Csmp1, referenced to ground, via a switch 320, at the level of a node 326. Switch 320 is for example controlled by switching signal SMP. Node 326 is further coupled, preferably connected, to the non-inverting input of amplifier 106. According to another embodiment, switch 320 is directly coupled to the output of potentiometer 315 instead of being coupled to the source of transistor MBIAS.

Bias loop BIAS LOOP comprises a current source 311 powering a potentiometer 315 coupled to ground. The output voltage of the potentiometer is reference voltage VREF. Voltage VREF1 is equal to voltage VREF or is approximately equal to voltage VREF. For example, voltage VREF1 is offset with respect to voltage VREF by the offset voltage between the inverting and non-inverting inputs of amplifier 203. The output of the potentiometer is coupled, preferably connected, to the non-inverting input of an operational amplifier similar to the amplifier 203 of FIG. 2 and which is thus referenced in the same way. The output of operational amplifier 203 is coupled, preferably connected, to the front gate of a transistor MBIAS. The inverting input of operational amplifier 203 is coupled, preferably connected, to the source of transistor MBIAS and to a current source 318. Current source 318 is for example coupled to ground. The drain of transistor MBIAS is powered by power supply rail VDD. Transistors MBIAS, MLOOP, and MVRT are for example matched together, as well as with the current sources which are dedicated thereto, so that the average output potential, that is, its idle level, of operational amplifier 106 corresponds to the back gate potential of transistor MBIAS. In other words, due to the matching between transistors MBIAS and MLOOP, the voltage applied to the back gate 310 of transistor MLOOP by amplifier 106, that is, its average output level, corresponds to the voltage applied to the back gate of transistor MBIAS in loop BIAS LOOP. According to an embodiment, the voltage applied to the back gate of transistor MBIAS is obtained by connecting the back gate of transistor MBIAS to its front gate. It is also possible to deliver the voltage on the back gate of transistor MBIAS in a different way. For example, according to an embodiment, not shown, the applied voltage originates from a source external to loop BIAS LOOP.

The value of the output voltage VREF of potentiometer 315 is selected to target the power supply voltage VRTSF of pixel array 20. If power supply voltage VRTSF at the level of the source of transistor MVRT is desired to be obtained, then voltage VGVRT should take into account the gate-source voltage of transistor MVRT. The value of the voltage VGVRT obtained at the output of operational amplifier 203 is increased, with respect to the targeted voltage VRTSF, by the gate-source voltage of transistor MBIAS.

Both samplings with switches 306 and/or 320 are aimed to improve the noise, eliminating any contribution from the bias loop at the output.

In the example of FIG. 3, operational amplifier 106, which drives the back gates of MLOOP and MVRT, has an operating portion centered on voltage VGVRT. It will be within the abilities of those skilled in the art to implement other embodiments to deliver a voltage to the back gate of transistor MBIAS, which will determine the operating point at the output of amplifier 106.

By controlling the voltage at the level of back gates 304 and 310, it is possible to finely and continuously regulate over time the voltage at the level of the source of transistor MVRT and this, over a wide frequency range.

By coupling the output of operational amplifier 106 to back gates 304, 310, the noise generated during the voltage regulation is advantageously limited by a ratio, equal to gmb/(gm+gmb), which is similar for transistors MLOOP and MVRT when the latter are matched together. Transconductance gmb is specific to each of these transistors, and associated with the back gate. Transconductance gm is specific to each of these transistors, and associated with the front gate. For a given transistor, transconductance gmb is smaller than transconductance gm, the ratio is thus smaller than 1. Further, the capacitance of each of back gates 304, 310 being much smaller than the capacitance linked to each of front gates 302, 308, it is possible to obtain a regulation of voltages VRTLOOP and VRTSF with the closed loop over a wide frequency band.

An additional advantage of the power supply circuit 300 of FIG. 3 is that a decoupling capacitive element, external to the circuit, is not necessary. Indeed, the loop is internally stabilized by Miller capacitive element Cmiller, which is of low value, which enables the integration of Miller capacitive element Cmiller within the circuit, and allows regulation at high frequency. The absence of a decoupling capacitive element external to the power supply circuit particularly enables performance improvement, cost reduction, and compliance with the PSRR specification in the targeted frequency band, which is 10 MHz for the power supply of certain image sensors.

Although, in the example of FIG. 3, a single switch and a single capacitor are used to sample and store voltage VGVRT at the level of the two front gates 302, 308, according to an embodiment, not shown in FIG. 3, switch 306 and capacitor Csmp2 may be duplicated for each front gate 302, 308.

Although, in the example of FIG. 3, bias voltages VGVRT and VREF originate from the same bias loop BIAS LOOP, it will be within the abilities of those skilled in the art to envisage a closed loop adapted to each of these voltages. Further, those skilled in the art may implement other means than a closed loop to generate voltages VGVRT and/or VREEF1. In view of the different possibilities accessible to those skilled in the art to implement voltages VGVRT and/or VREF1, in FIGS. 5 and 6, only the rails of supply of voltages VGVRT and VREF1 will be shown.

Figure 4:
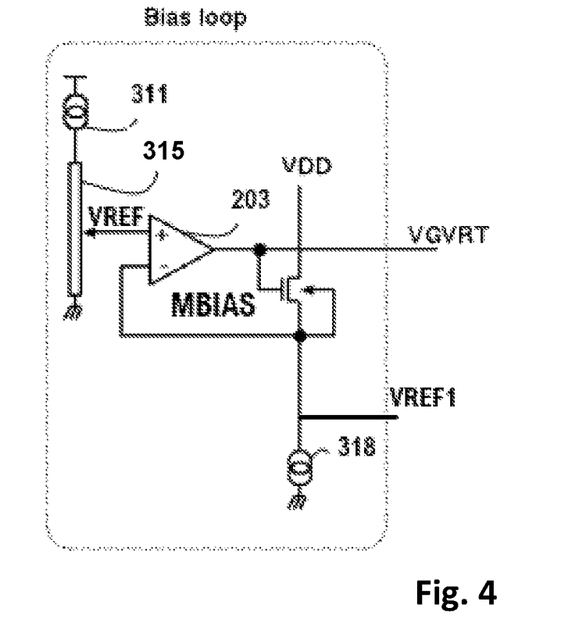
FIG. 4 schematically shows a closed bias loop of FIG. 3 according to another embodiment of the present description.

FIG. 4 schematically shows the closed bias loop BIAS LOOP of FIG. 3 according to another embodiment of the present description. In this example, the back gate of transistor MBIAS is coupled to the source of transistor MBIAS.

Figure 5:
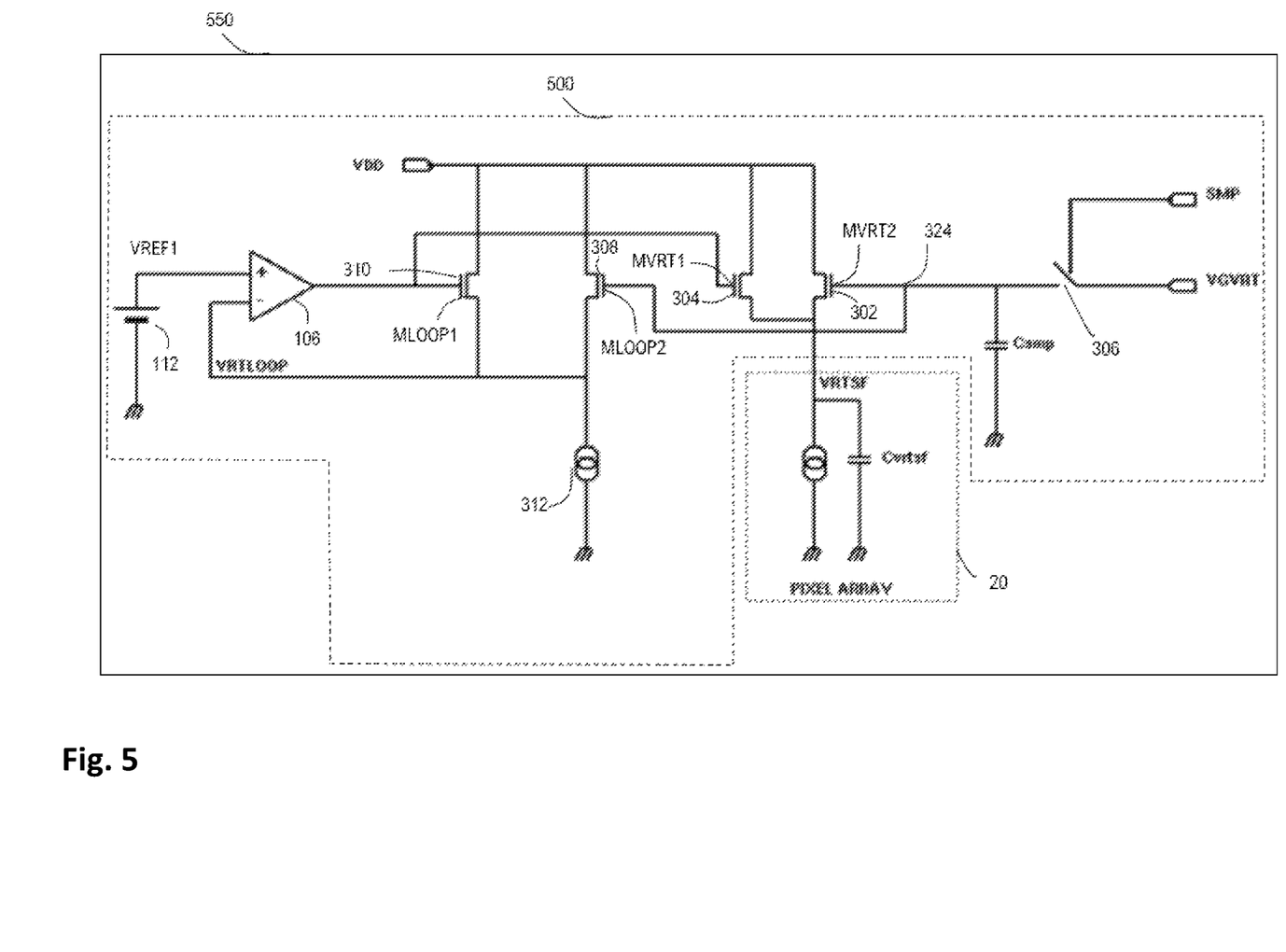
FIG. 5 schematically shows a power supply circuit powering a pixel array of an image sensor according to another embodiment of the present description.

FIG. 5 schematically shows a power supply circuit 500 powering the pixel array 20 of an image sensor 550 according to another embodiment of the present description.

The power supply circuit 500 of FIG. 5 is similar to power supply circuit 300, except for the fact that transistor MLOOP is replaced in FIG. 5 with transistors MLOOP1 and MLOOP2, and transistor MVRT is replaced in FIG. 5 with transistors MVRT2 and MVRT1.

The drains of transistors MLOOP1, MLOOP2 are coupled, preferably connected, together and the sources of transistors MLOOP1 and MLOOP2 are also coupled, preferably connected, together. Transistors MLOOP1 and MLOOP2 thus form a dual-gate transistor device. The gate of transistor MLOOP1 is coupled, preferably connected, to the output of operational amplifier 106 and the gate of transistor MLOOP2 is coupled, preferably connected, to node 324.

Similarly, the drains of transistors MVRT2 and MVRT1 are coupled, preferably connected, together and the sources of transistors MVRT2 and MVRT1 are also coupled, preferably connected, together. Transistors MVRT2 and MVRT1 thus form a dual-gate transistor device. The gate of transistor MVRT1 is coupled, preferably connected, to the output of operational amplifier 106 and the gate of transistor MVRT2 is coupled, preferably connected, to node 324.

Transistors MLOOP1, MLOOP2, MVRT2, and MVRT1 are for example bulk transistors with their substrate node coupled, for example, to ground.

In certain cases where the lengths of transistors MLOOP1 and MLOOP2 are equal, the width W2 of transistor MLOOP2 is greater than the width W1 of transistor MLOOP1 by a scale factor ($M_w$=W2/W1) equal to or greater than for example 5, or for example in the range from 10 to 20. The width of transistor MVRT2 is greater than that of transistor MVRT1 for example by the same scale factor. According to an example, the size of transistor MVRT2 is a multiple N of the size of transistor MLOOP2. According to an example, the size of transistor MVRT1 is a multiple, preferably the same multiple N, of the size of transistor MLOOP1. According to this example, transistor MVRT1 has a width W1*N and transistor MVRT2 has a width W2*N. Multiple N is for example equal to the ratio of the current supplied to pixel array 20 to the current supplied by current source 312. Multiple N is for example proportional to the number of columns to be powered in pixel array 20. In an example, multiple N is equal to or greater than 100, for example, equal to or greater than 150.

According to an example where the lengths of transistors MLOOP1, MLOOP2, MVRT1, or MVRT2 are different, the scale factor takes into account the respective lengths of the transistors and can be expressed as $M_{WL}$=(W2/L2)/(W1/L1) where L2 and L1 are respectively the lengths of transistors MLOOP2 and MLOOP1. Scale factor $M_{WL}$ is of the same order of magnitude as $M_w$.

In particular, for an optimal implementation, transistors MLOOP1, MLOOP2, MVRT2, and MVRT1, as well as the associated current sources, are matched.

In this configuration, the transconductance associated with the gate of transistor MVRT1 is thus smaller than the transconductance associated with the gate of transistor MVRT2. Similarly, the transconductance associated with the gate of transistor MLOOP1 is smaller than the transconductance associated with the gate of transistor MLOOP2. The ratio of the transconductance associated with the gate of transistor MVRT1 to the transconductance associated with the gate of transistor MVRT2 may be, by matching, the same as the ratio of the transconductance associated with the gate of transistor MLOOP1 to the transconductance associated with the gate of transistor MLOOP2. The gate of transistor MLOOP1 may thus have the same effect as the back gate 310 of transistor MLOOP on the total current conducted by transistors MLOOP1 and MLOOP2. Similarly, the gate of transistor MLOOP2 has the same effect as the front gate 308 of transistor MLOOP on this total current. The gate of transistor MVRT1 thus has the same effect as the back gate 304 of transistor MVRT on the total current conducted by transistors MVRT2 and MVRT1 and the gate of transistor MVRT2 has the same effect as the front gate 308 of transistor MVRT on this total current.

Figure 6:
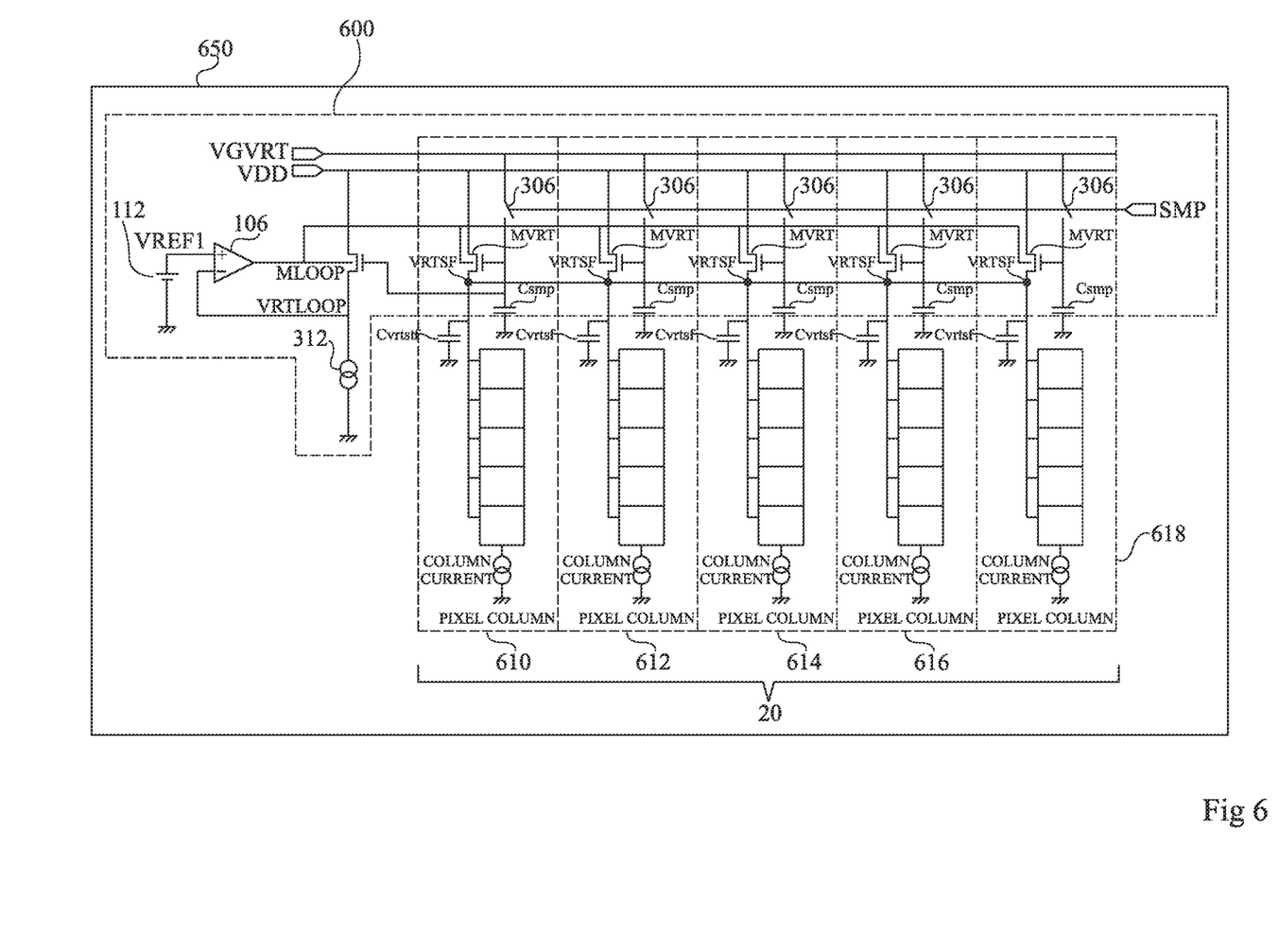
FIG. 6 schematically shows a power supply circuit powering a pixel array of an image sensor according to another embodiment of the present description.

FIG. 6 schematically shows a power supply circuit 600 powering a pixel array 20 of an image sensor 650 according to another embodiment of the present description.

Power supply circuit 600 comprises operational amplifier 106, voltage generator 112, transistor MLOOP and current source 312 arranged similarly to the left-hand portion of the power supply circuit 10 of FIG. 1. The pixel array 20 of FIG. 6 is divided into five columns 610, 612, 614, 616, and 618 of pixels in parallel. The number of columns is however not limited and may reach several hundreds or even several thousands.

In the power supply circuit of FIG. 6, the transistor MVRT of FIG. 3 is distributed into a plurality of transistors to have a transistor powering each column or group of columns. In this case, the combined width of all the transistors MVRT obtained in FIG. 6 is equivalent, for example, to the width of the transistor MVRT of the example of FIG. 3. Further, switch 306 and capacitor Csmp are for example repeated to sample and store voltage VGVRT on the gate of each transistor MVRT.

The distribution of the transistors MVRT of FIG. 6 enables decreasing the current level of each source of the transistors MVRT of power supply circuit 600. This enables homogenization of the power supply between each column or group of columns so that all columns see the same voltage while avoiding voltage drops between the columns.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

What is claimed is:

1. A power supply circuit comprising:
a first transistor device comprising a first gate associated with a first transconductance and a second gate associated with a transconductance greater than the first transconductance; and
a second transistor device comprising a third gate associated with a second transconductance and a fourth gate associated with a transconductance greater than the second transconductance, wherein the second transistor device is configured to supply power to at least one load, wherein the first and the third gates are controlled by a closed regulation loop, and the second and the fourth gates are controlled by a sampled reference voltage.

2. The circuit according to claim 1, wherein:
the closed regulation loop comprises an operational amplifier having a non-inverting input configured to receive a voltage to be followed, and an inverting input configured to receive a voltage present on a source of the first transistor device; and
the first and the third gates are coupled to an output of the operational amplifier.

3. The circuit according to claim 1, wherein the first gate of the first transistor device and the third gate of the second transistor device are back gates.

4. The circuit according to claim 1, wherein the sampled reference voltage is generated by a further closed regulation loop comprising a transistor having a front gate coupled to an output of an operational amplifier; and
transistors of the first and second transistor devices and the transistor of the further closed regulation loop are matched together.

5. The circuit according to claim 1, wherein:
the closed regulation loop comprises a first operational amplifier having a non-inverting input configured to receive a voltage to be followed, and an inverting input configured to receive a voltage present on a source of the first transistor device; and
the first and the third gates are coupled to an output of the first operational amplifier;
the first gate of the first transistor device and the third gate of the second transistor device are back gates;
the sampled reference voltage is generated by a further closed regulation loop comprising a transistor having a front gate coupled to an output of a second operational amplifier;
transistors of the first and second transistor devices and the transistor of the further closed regulation loop are matched together;
the transistor of the further closed regulation loop comprises a back gate; and
a voltage applied to the first gate of the first transistor device by the first operational amplifier is configured to be substantially equal to a voltage applied to said back gate of the transistor of the further closed regulation loop.

6. The circuit according to claim 1, wherein:
the first transistor device comprises a first transistor comprising the first gate and a second transistor comprising the second gate, a source of the first transistor being connected to a source of the second transistor, and a drain of the first transistor being connected to a drain of the second transistor; and
the second transistor device comprises a third transistor comprising the third gate and a fourth transistor comprising the fourth gate, a source of the third transistor being connected to a source of the fourth transistor, and a drain of the third transistor being connected to a drain of the fourth transistor.

7. The circuit according to claim 6, wherein a width of the second transistor is greater than a width of the first transistor or a width of the third transistor is greater than a width of the fourth transistor.

8. The circuit according to claim 1, further comprising a plurality of second transistor devices having third gates coupled together, wherein each second transistor device of the plurality of second transistor devices are configured to power a different load.

9. The circuit according to claim 8, wherein sources of each second transistor device of the plurality of second transistor devices are coupled together.

10. An image sensor comprising:
the power supply circuit according to claim 8; and
a plurality of pixel columns, each pixel column of the plurality of pixel columns powered by a corresponding second transistor device of the plurality of second transistor devices.

11. The circuit according to claim 1, wherein a width of the second transistor device is a multiple k of a width of the first transistor device, wherein multiple k is equal to or greater than 5.

12. The circuit according to claim 1, wherein the first transistor device comprises a first main conducting node configured to supply the closed regulation loop.

13. The circuit according to claim 12, wherein a first main conducting node of the second transistor device is configured to supply the at least one load, and the first main conducting node of the first transistor device is configured to have a capacitance that is smaller than a capacitance of the first main conducting node of the second transistor device.

14. The circuit according to claim 13, wherein the first main conducting node of the first transistor device is not connected to the second transistor device.

15. The circuit according to claim 14, wherein a width of the second transistor device is a multiple k of a width of the first transistor device, the multiple k being equal to or greater than 1, and wherein the first main conducting node of the first transistor device is configured to have a capacitance that is 10*k times smaller than the capacitance of the load.

16. An image sensor comprising:
the power supply circuit according to claim 1; and
at least one pixel coupled to the power supply circuit.

17. A load powering method, comprising:
controlling a first gate of a first transistor device with a closed regulation loop;
controlling a second gate of the first transistor device with a sampled reference voltage, the first gate being associated with a first transconductance and the second gate being associated with a transconductance greater than that associated with the first gate;
controlling a third gate of a second transistor device with the closed regulation loop;
controlling a fourth gate of the second transistor device with the sampled reference voltage, the third gate being associated with a second transconductance and the fourth gate being associated with a transconductance greater than the second transconductance; and
providing power to at least one load via the second transistor device.

18. The method of claim 17, wherein the first gate of the first transistor device and the third gate of the second transistor device are back gates.

19. The method of claim 17, wherein:
the first transistor device comprises a first transistor comprising the first gate and a second transistor comprising the second gate, a source of the first transistor being connected to a source of the second transistor, and a drain of the first transistor being connected to a drain of the second transistor; and
the second transistor device comprises a third transistor comprising the third gate and a fourth transistor comprising the fourth gate, a source of the third transistor being connected to a source of the fourth transistor, and a drain of the third transistor being connected to a drain of the fourth transistor.

20. The method of claim 17, wherein:
the second transistor device comprises a plurality of second transistor devices; and
providing power to the at least one load comprises providing power to a plurality of loads via corresponding second transistor devices of the plurality of second transistor devices.

21. A voltage regulator comprising:
a first sample and hold circuit having an input coupled to a first reference node configured to provide a first reference voltage;
a second sample and hold circuit having an input coupled to a second node configured to provide a second reference voltage;
a replica transistor having a front gate coupled to an output of the first sample and hold circuit;
a power transistor having a front gate coupled to an output of the first sample and hold circuit, and an output node configured to be coupled to a load; and
a first operational amplifier having a first input coupled to an output node of the replica transistor, a second input coupled to an output of the second sample and hold circuit, and an output coupled to a back gate of the replica transistor, and a back gate of the power transistor.

22. The voltage regulator of claim 21, further comprising a bias generator, the bias generator comprises:
a second operational amplifier having an output coupled to the first reference node, a first input coupled to the second node, and a second input coupled to a reference voltage node; and
a transistor having a front gate coupled to the output of the second operational amplifier and an output node coupled to the second node.

23. The voltage regulator of claim 21, wherein the power transistor comprises a plurality of power transistors having output nodes configured to be coupled to a corresponding plurality of loads.

24. The voltage regulator of claim 21, wherein:
the first sample and hold circuit comprises a first sampling switch coupled to a first capacitor; and
the second sample and hold circuit comprises a second sampling switch coupled to a second capacitor.

* * * * *